(12) United States Patent
Tashiro

(10) Patent No.: US 7,683,907 B2
(45) Date of Patent: Mar. 23, 2010

(54) IMAGE FORMING APPARATUS AND DISPLAY CONTROL PROGRAM PRODUCT

(75) Inventor: Michiko Tashiro, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 11/710,046

(22) Filed: Feb. 23, 2007

(65) Prior Publication Data

US 2007/0200856 A1 Aug. 30, 2007

(30) Foreign Application Priority Data

Feb. 24, 2006 (JP) ............... 2006-049317

(51) Int. Cl.
- G09G 5/36 (2006.01)
- G06F 15/00 (2006.01)
- G06T 1/00 (2006.01)
- G06F 3/041 (2006.01)
- G06K 15/22 (2006.01)
- G06F 3/00 (2006.01)
- H04N 1/00 (2006.01)

(52) U.S. Cl. ............... 345/545; 345/501; 345/173; 358/1.13; 358/1.16; 710/8

(58) Field of Classification Search ............... 358/1.9, 358/1.15, 1.16, 401, 1.13; 345/581, 619, 345/501, 625, 634, 636, 682, 173, 175, 520, 345/545; 348/14.07, 14.03; 715/210, 716; 710/8
See application file for complete search history.

(56) References Cited

U.S. PATENT DOCUMENTS

| | | | | |
|---|---|---|---|---|
| 5,119,079 A * | 6/1992 | Hube et al. | ............... | 715/823 |
| 5,937,150 A * | 8/1999 | Phan | ............... | 358/1.15 |
| 6,069,706 A * | 5/2000 | Kajita et al. | ............... | 358/1.15 |
| 6,100,994 A * | 8/2000 | Schliekelmann et al. | ... | 358/1.15 |
| 6,292,271 B1 * | 9/2001 | Phan | ............... | 358/440 |
| 6,369,833 B1 * | 4/2002 | van Liempd et al. | ........ | 715/700 |
| 6,459,423 B1 * | 10/2002 | Shimoosawa et al. | ....... | 345/173 |
| 6,480,297 B1 * | 11/2002 | Suzuki et al. | ............... | 358/1.16 |
| 6,498,658 B1 * | 12/2002 | Sekikawa | ............... | 358/1.16 |
| 6,782,402 B1 * | 8/2004 | Hidaka et al. | ............... | 707/203 |
| 6,898,389 B2 * | 5/2005 | Osada | ............... | 399/81 |
| 6,970,588 B1 * | 11/2005 | Komatsu | ............... | 382/141 |

(Continued)

FOREIGN PATENT DOCUMENTS

JP 02-212914 8/1990

(Continued)

*Primary Examiner*—Twyler L. Haskins
*Assistant Examiner*—Jonathan R Beckley
(74) *Attorney, Agent, or Firm*—Gerald E. Hespos; Anthony J. Casella

(57) ABSTRACT

An image forming apparatus including: a display portion for displaying an image; a storing portion for storing a plurality of operative instruction reception images, and operation guide images associated with the respective operative instruction reception images; a display controller for controlling the display portion to display an operative instruction reception image or an operation guide image stored in the storing portion; and an instruction receiving portion for receiving from an operator a display instruction to display an operation guide image. When the instruction receiving portion receives a display instruction, the display controller controls the display portion to display an operation guide image associated with an operative instruction reception image displayed on the display portion at the time when the instruction receiving portion receives a display instruction.

4 Claims, 5 Drawing Sheets

U.S. PATENT DOCUMENTS

| | | | |
|---|---|---|---|
| 6,977,735 B1 * | 12/2005 | Ookuma | 358/1.13 |
| 7,006,249 B2 * | 2/2006 | Matsuda | 358/1.9 |
| 7,130,078 B2 * | 10/2006 | Matsuda | 358/1.9 |
| 7,164,486 B1 * | 1/2007 | Nakamura et al. | 358/1.15 |
| 7,173,724 B2 * | 2/2007 | Nomura et al. | 358/1.15 |
| 7,180,628 B1 * | 2/2007 | Motohashi et al. | 358/1.9 |
| 7,301,659 B2 * | 11/2007 | Timperman et al. | 358/1.15 |
| 7,330,280 B2 * | 2/2008 | Kanazawa | 358/1.13 |
| 7,370,080 B2 * | 5/2008 | Yoshida | 709/206 |
| 7,430,059 B2 * | 9/2008 | Rodrigues et al. | 358/1.9 |
| 7,480,064 B2 * | 1/2009 | Katano | 358/1.15 |
| 2002/0054279 A1 | 5/2002 | Hoshino et al. | |
| 2003/0007188 A1 | 1/2003 | Hoshino et al. | |
| 2004/0090451 A1 * | 5/2004 | Lay et al. | 345/713 |
| 2004/0169881 A1 * | 9/2004 | Sato | 358/1.15 |
| 2004/0264993 A1 | 12/2004 | Konuma et al. | |
| 2005/0270563 A1 * | 12/2005 | Kamata et al. | 358/1.15 |
| 2007/0200856 A1 * | 8/2007 | Tashiro | 345/501 |

FOREIGN PATENT DOCUMENTS

| | | |
|---|---|---|
| JP | 4-114230 | 4/1992 |
| JP | 11-327746 | 11/1999 |
| JP | 2003-125132 | 4/2003 |
| JP | 2005-37886 | 2/2005 |
| JP | 2005-136646 | 5/2005 |

* cited by examiner

IMAGE FORMING APPARATUS AND DISPLAY CONTROL PROGRAM PRODUCT

BACKGROUND OF THE INVENTION

1. Field of the Invention

The present invention relates to image forming apparatuses such as a copying machine, a facsimile apparatus and a composite machine, and a display control program product. More particularly, it relates to a technology for displaying an image on a display portion.

2. Description of the Related Art

Conventionally, there have been image forming apparatuses such as a copying machine, a facsimile apparatus and a composite machine each provided with a display device which displays a functional explanation of a respective operation key provided on an operation panel to improve operational convenience for an operator (for example, refer to Japanese Unexamined Patent Publication No. 2003-125132). In such image forming apparatus, when an operator presses a help key and any operation key on an operation panel, a display device displays a function of an operation key pressed by the operator. Thus, the operator can find a function of a respective operation key.

However, image forming apparatuses nowadays tend to have various functions. Further, various windows are displayed on a display device for receiving various operative instructions from an operator. If an operation guide corresponding to a status of operation or content displayed on the display device is not sufficient, it becomes difficult for an operator to effectively use various functions of the image forming apparatus. According to the image forming apparatus described in the aforementioned publication, an operator can find a function of a respective operation key by referring to an operation guide displayed by the display device. However, the operator cannot obtain an appropriate operation guide corresponding to a status of operation or content displayed on the display device.

SUMMARY OF THE INVENTION

The present invention was made to solve the aforementioned problem, and its object is to appropriately provide an operation guide to an operator correspondingly to a status of operation or content displayed on a display device.

More specifically, an image forming apparatus according to the present invention comprises: a display portion for displaying an image; a storing portion for storing a plurality of operative instruction reception images, and operation guide images associated with the respective operative instruction reception images; a display controller for controlling the display portion to display an operative instruction reception image or an operation guide image stored in the storing portion; and an instruction receiving portion for receiving from an operator a display instruction to display an operation guide image. When the instruction receiving portion receives a display instruction, the display controller controls the display portion to display an operation guide image associated with an operative instruction reception image displayed on the display portion at the time when the instruction receiving portion receives a display instruction.

According to the aforementioned arrangement, when the instruction receiving portion receives a display instruction at the time when the operative instruction reception image is displayed on the display portion, the display controller controls the display portion to display an operation guide image associated with the displayed operative instruction reception image. Accordingly, an operation guide image corresponding to a displayed operative instruction reception image is selectively displayed on the display portion. Thus, according to the present invention, an operation guide can be appropriately provided to an operator correspondingly to content displayed on the display portion while content changes in response to changes in a status of operation.

These and other objects, features and advantages of the present invention will become more apparent upon reading of the following detailed description along with the accompanied drawings.

DETAILED DESCRIPTION OF THE PREFERRED EMBODIMENTS

Figure 1:
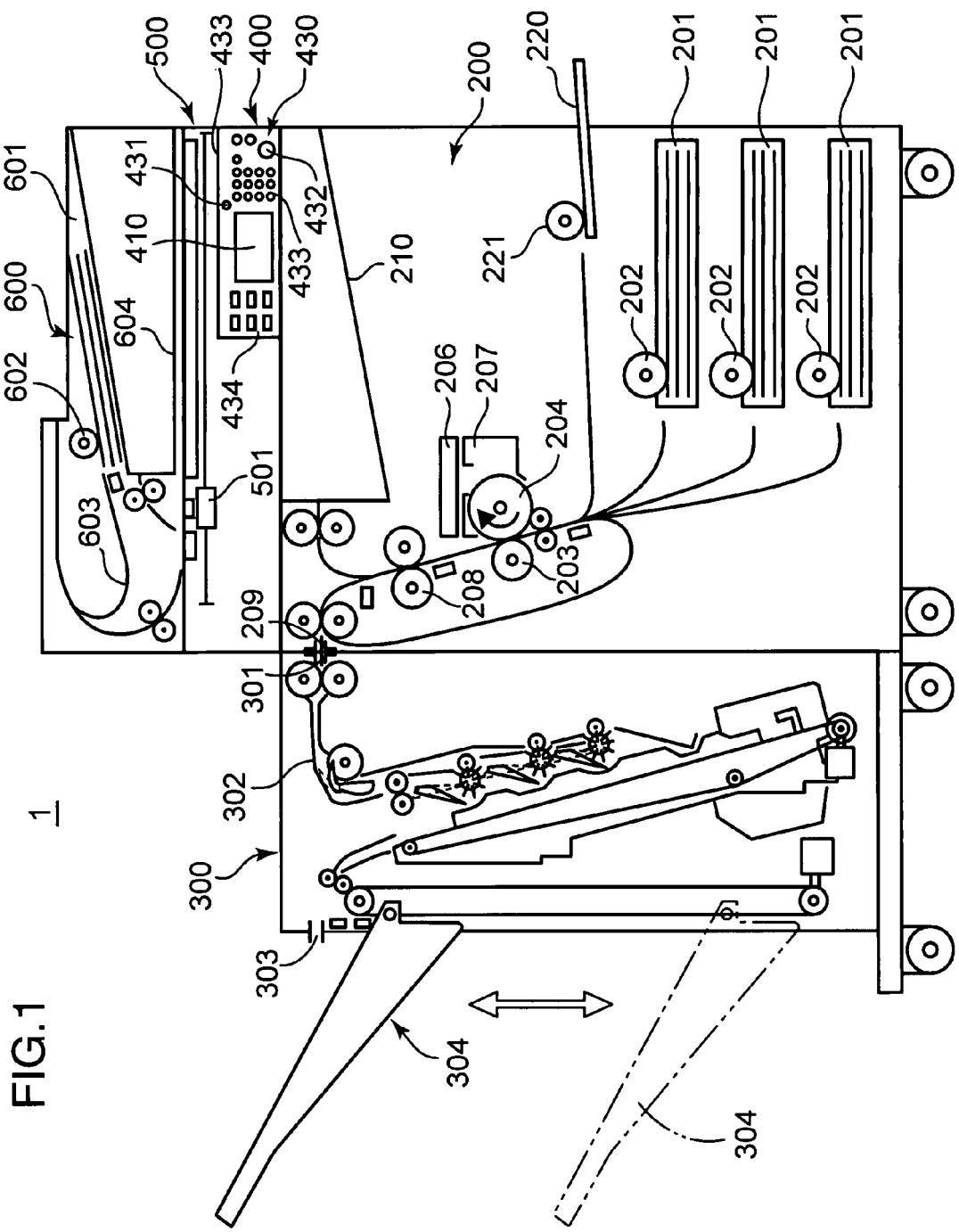
FIG. 1 is a side view schematically showing a configuration of a composite machine embodying the invention.
Figure 2:
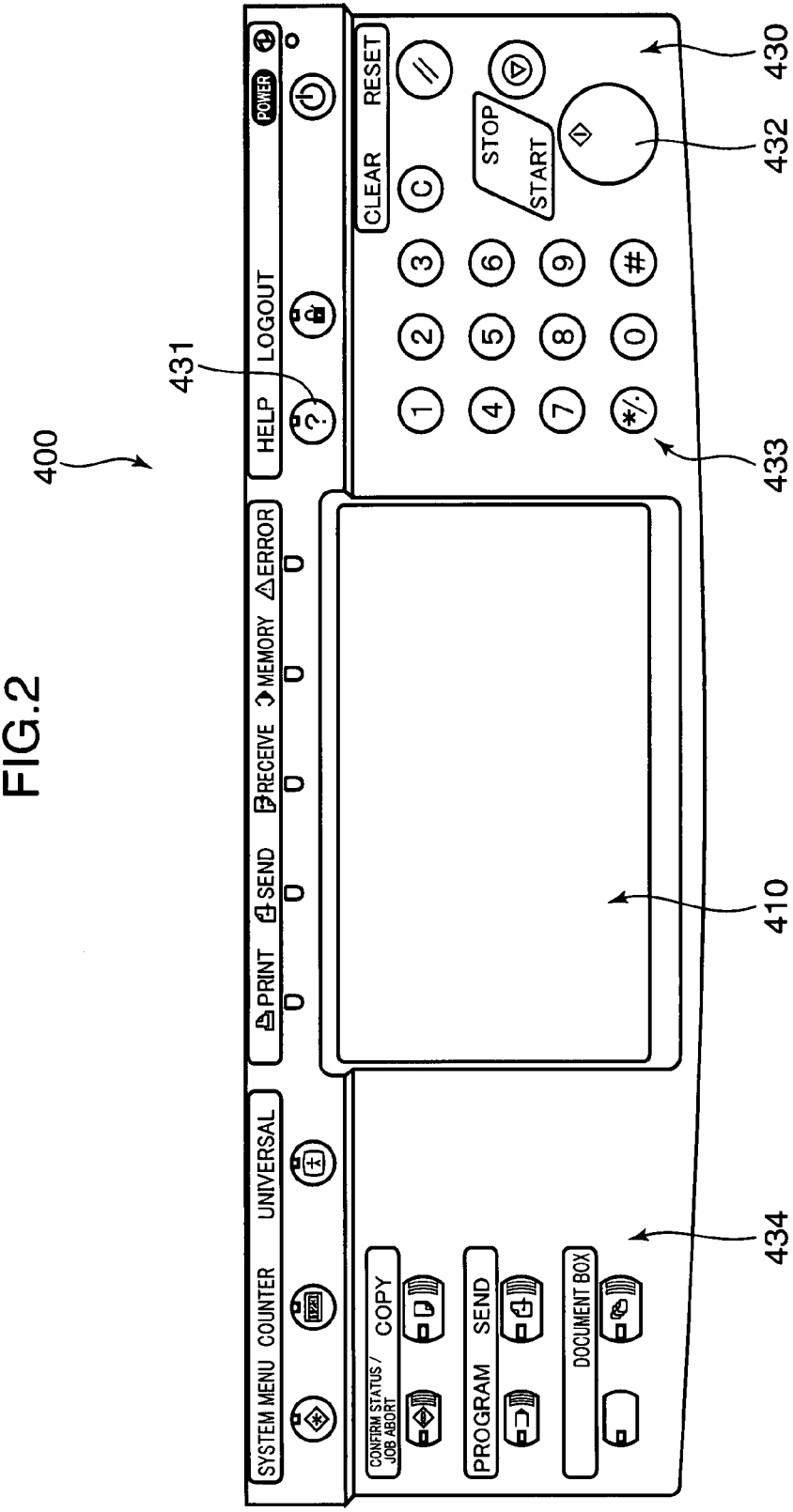
FIG. 2 is a partially enlarged view of an operating section.

Hereinafter, a composite machine embodying an image forming apparatus according to the invention is described with reference to the drawings. FIG. 1 is a side view schematically showing a configuration of the composite machine embodying the invention. FIG. 2 is a partially enlarged view of an operating section 400. A composite machine I includes a main body 200, a sheet postprocessing section 300, the operating section 400, a document reading section 500 and a document feeding section 600. The sheet postprocessing section 300 is disposed on the sheet discharging side, for example, on the left side of the main body 200. The operating section 400 is adapted for allowing a user to input various operational commands. The document reading section 500 is disposed in an upper portion of the main body 200. The document feeding section 600 is disposed on the document reading section 500.

As shown in FIG. 2, the operating section 400 includes a display portion 410 and an operation key portion 430. The display portion 410 includes an LCD (Liquid Crystal Display). The operation key portion 430 is adapted for allowing an operator to input an operative instruction. The operation key portion 430 has a help key 431, a start key 432, numerical keys 433 and a function switching key 434.

The help key (instruction receiving portion) 431 is adapted for receiving instructions from an operator to display operation guide windows (help window) on the display portion 410. The operation guide windows display respective operation methods relating to a scanner function, a facsimile function, a printer function, a copying function and the like. The start key 432 receives from an operator an instruction to start respective operations for copying, scanning and the like. The numerical keys 434 are adapted for receiving from an operator an instruction to specify the number of copies or the like. The function switching key 434 is a key adapted for receiving from an operator a function switching instruction of switching functions between a copying function, a transmission function (scanner function, facsimile function or the like), a box function (a function of reading and printing data stored in a storing area for each operator (mail box) which is provided in an HDD 74 described hereinafter) or the like.

The display portion 410 is constructed by a touch-panel unit or the like including a touch panel and an LCD. The display portion 410 displays various operation windows. Further, an operator is capable of inputting operational instructions of various functions by touching a display surface (displayed operation key) of the display portion 410.

The document feeding section 600 includes a document placing portion 601, a sheet feeding roller 602, a document conveying portion 603 and a document discharging portion 604. The document reading section 500 includes a scanner 501. The sheet feeding roller 602 conveys the required numbers of documents set on the document placing portion 601 one by one. The document conveying portion 603 conveys the documents successively to a reading position of the scanner 501. The scanner 501 reads images of the conveyed documents successively. The documents read by the scanner 501 are discharged to the document discharging portion 604.

The main body 200 includes a plurality of sheet feeding cassettes 201, a plurality of sheet feeding rollers 202, a transferring roller 203, a photoconductive drum 204, a exposing device 206, a developing device 207, a fixing roller 208, a discharging outlet 209 and a discharging tray 210.

The photoconductive drum 204 is rotated in a direction indicated by an arrow and uniformly charged by a charging device (not shown). The exposing device 206 scans on the photoconductive drum 204 laser light modulated correspondingly to an image of document read out in the document reading section 500 and forms electrostatic latent images for respective colors on a surface of the photoconductive drum 204. The developing device 207 supplies developer of black color to the photoconductive drum 204 and forms a toner image.

On the other hand, the sheet feeding rollers 202 draws a printing sheet from the sheet feeding cassette 201 storing the printing sheet and then conveys the printing sheet to the transferring roller 203. The transferring roller 203 transfers a toner image from the photoconductive drum 204 to the conveyed printing sheet. The fixing roller 208 fixes the transferred toner image onto the printing sheet by heating the toner image. After that, the printing sheet is conveyed from the discharging outlet 209 of the main body 200 to the sheet postprocessing section 300. If necessary, the printing sheet is discharged to the discharging tray 210.

The sheet postprocessing section 300 includes an inlet 301, a printing sheet conveying portion 302, an outlet 303, a stack tray 304 and the like. The printing sheet conveying portion 302 successively conveys a printing sheet conveyed from the discharging outlet 209 to the inlet 301 and eventually discharges the printing sheet from the outlet 303 to the stack tray 304. The stack tray 304 is capable of moving upward and downward in directions indicated by an arrow correspondingly to the number of stacked printing sheets conveyed from the outlet 303.

Figure 3:
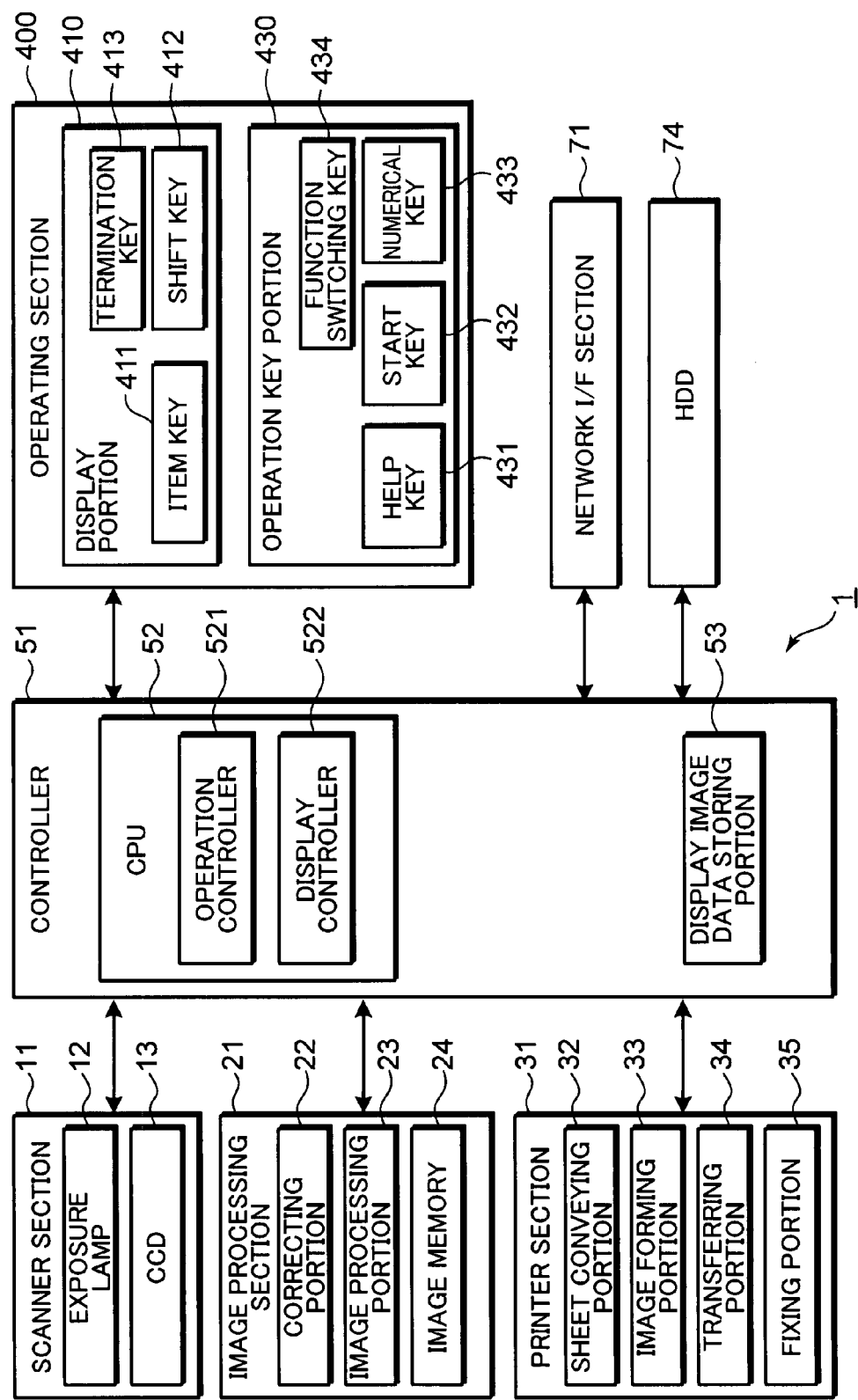
FIG. 3 is a control block diagram of the composite machine shown in FIG. 1.

FIG. 3 is a control block diagram of the composite machine shown in FIG. 1. The composite machine I includes a scanner section 11, an image processing section 21, a printer section 31, the operating section 400, a controller 51, a network I/F (interface) section 71 and the HDD (Hard Disk Drive) 74.

The scanner section 11 includes an exposing lamp 12 and a CCD (Charge-Coupled Device) 13 constituting the scanner 501 shown in FIG. 1. The scanner section 11 illuminates a document with the exposing lamp 12 and receives reflected light with CCD 13, and thereby reading an image from the document. Thereafter, the scanner section 11 outputs to the image processing section 21 an image corresponding to the read image.

The image processing section 21 includes a correcting portion 22, an image processing portion 23 and an image memory 24. The image processing section 21 processes the read image with the correcting portion 22 and the image processing portion 23 if necessary, and then the processed image is stored in the image memory 24 or outputted to the printer section 31. The correcting portion 22 performs predetermined correction processings such as a level correction and γ-correction to the read image. The image processing portion 23 performs various processings such as compression or extension processings, enlargement or contraction processings and the like.

The printer section 31 includes a sheet conveying portion 32, an image forming portion 33, a transferring portion 34 and a fixing portion 35. The sheet conveying portion 32 has the sheet feeding cassettes 201 and the sheet feeding roller 202 shown in FIG. 1. The image forming portion 33 has the photoconductive drum 204, the exposing device 206 and the developing device 207 shown in FIG. 1. The transferring portion 34 has the transferring roller 203 shown in FIG. 1. The fixing portion 35 has the fixing roller 208 shown in FIG. 1. The printer section 31 prints an image on a recording sheet by using document data read in the scanner section 11. Specifically, the sheet conveying portion 32 conveys a recording sheet to the image forming portion 33. The image forming portion 33 forms a toner image corresponding to the image. The transferring portion 34 transfers the toner image to the recording sheet. The fixing portion 35 fixes the toner image on the recording sheet and forms an image.

The network I/F section 71 controls various data transmission with respect to an external device via LAN by using a network interface (10/100 Base-TX) or the like.

The HDD 74 is constructed by a magnetic disk, for example. The HDD 74 stores an operating system which is a basic program for integrally controlling a personal computer, a display control program (display control program product) embodying the invention, and the like. The display control program controls a CPU 52 to perform a processing of displaying on the display portion 410 an operation guide for an operator based on an operation inputted to the operating section 400 by the operator. Further, the HDD 74 stores an image read in the scanner section 11, an output format which is set for the image, and the like.

As shown in FIGS. 1 and 2, the operating section 400 includes the display portion 410 and the operation key portion 430. The display portion 410 has an item key 411 and a shift key 412 (switching reception key) for receiving from an operator an instruction to switch display windows between a plurality of operation guide windows by using a touch-panel function. Further, the display portion 410 has a termination key 413 for receiving from an operator an instruction to terminate an operation guide window. The item key 411, the shift key 412 and the termination key 413 are displayed on the display portion 410 at an appropriate time by a display controller 522.

The help key 431, the start key 432, the numerical keys 433 and the function switching key 434 are not keys utilizing a touch-sensor but are constructed mechanically.

The controller 51 includes the CPU 52 and a display image data storing portion 53. The CPU 52 controls an operation of the composite machine 1. The display image data storing portion (storing portion) 53 stores various still image data, moving image data and the like to be displayed on the display portion 410. Under a control of the CPU 52 in accordance with the display control program, for example, a part of the HDD 74 functions as the image data storing portion 53.

By executing the display control program under a control of the operating system, the CPU 52 also functions as an operation controller 521 and a display controller 522. The operation controller 521 controls operations of respective sections (scanner section 11, image processing section 21, printer section 31 and the like) of the composite machine 1.

The display controller 522 controls an operation of the display portion 410. The display controller 522 reads out from the display image data storing portion 53 still image data or moving image data necessary for displaying an operative instruction reception window and an operation guide window and plays the image data. Then, the display controller 522 controls the display portion 410 to display the images. In the present embodiment, an operative instruction reception window and an operation guide window may be any one of a moving image or a still image.

Figure 4:
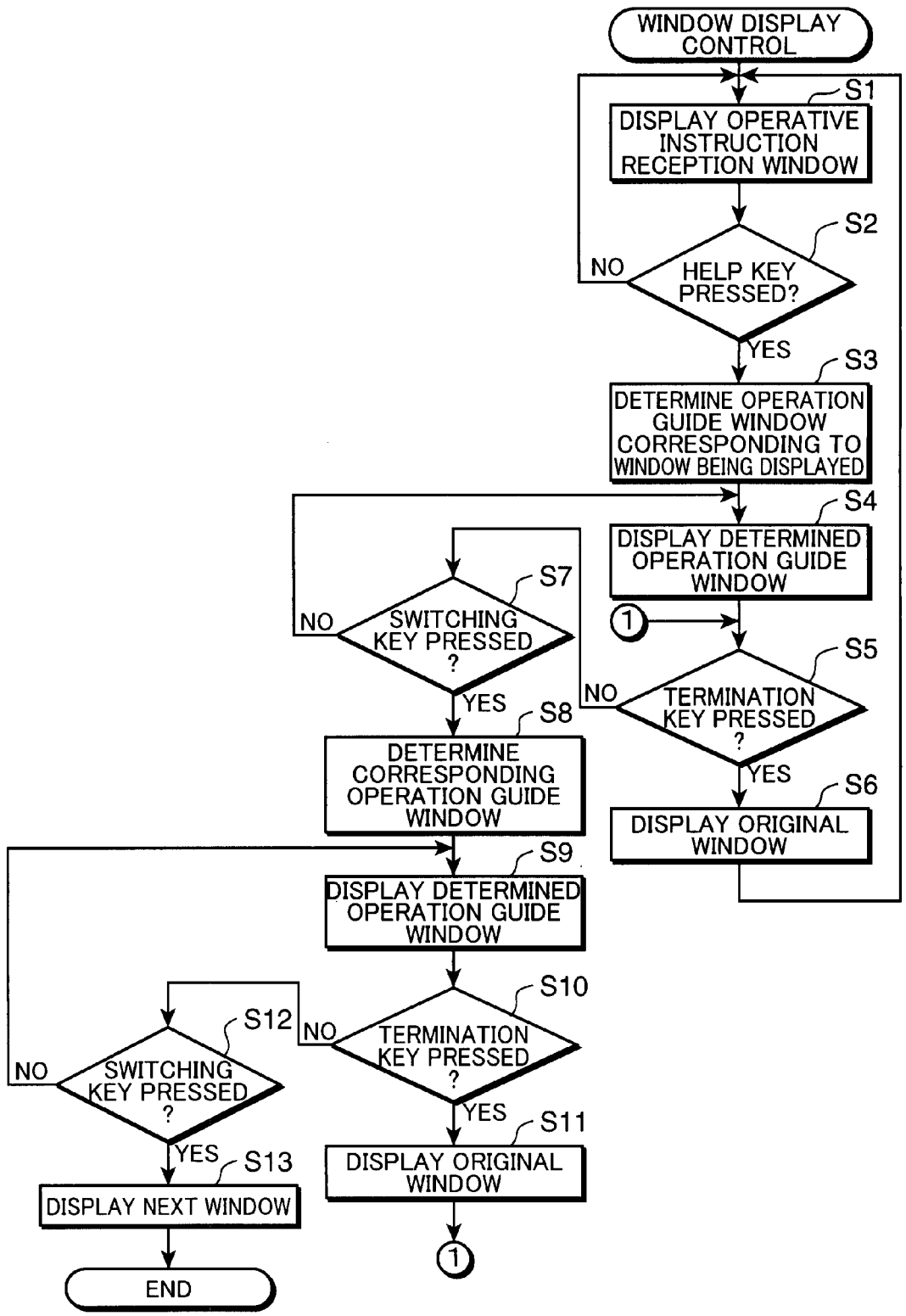
FIG. 4 is a flowchart showing a window display control in the composite machine.
Figure 5:
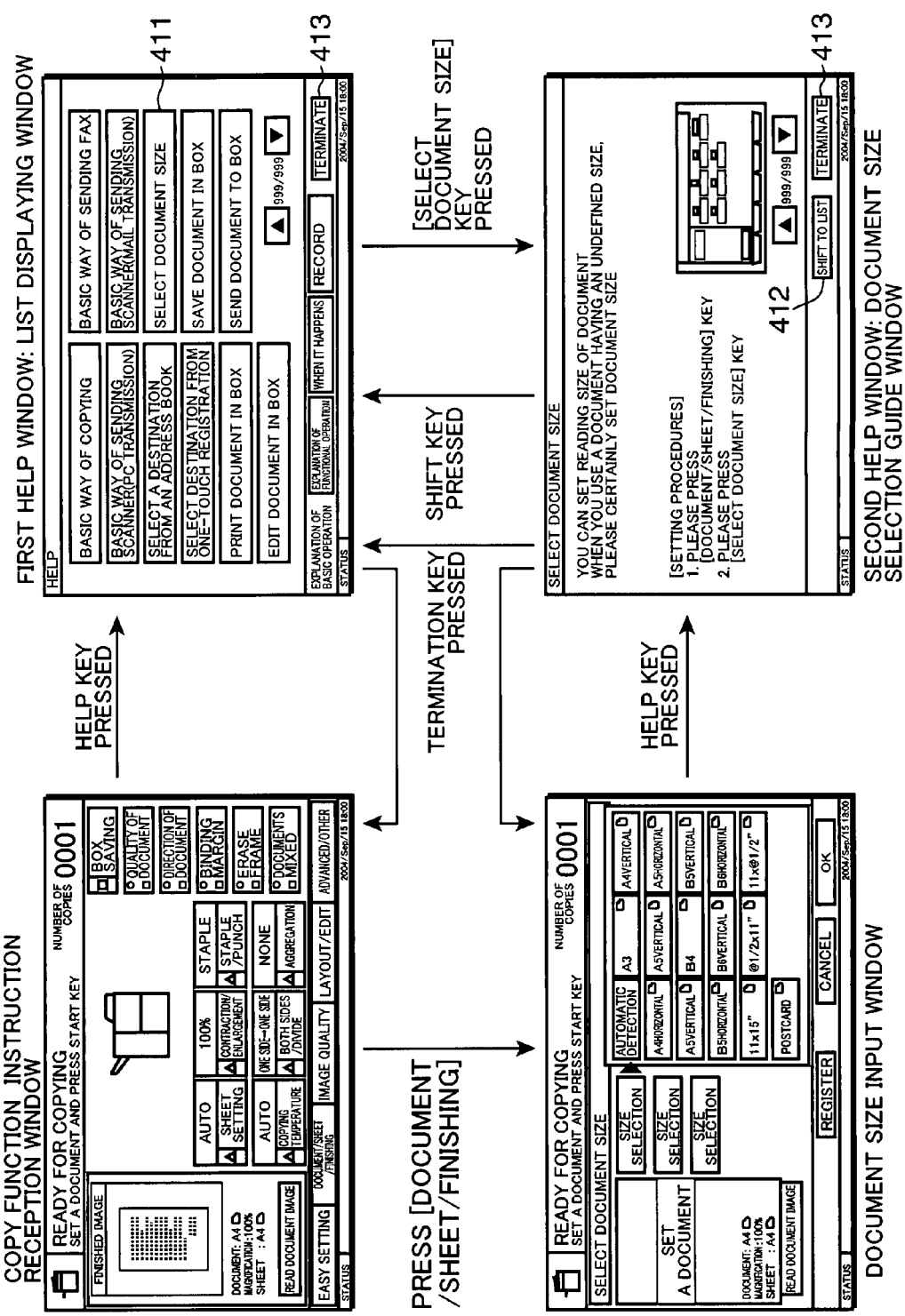
FIG. 5 is a diagram showing transitions windows displayed on the display portion.

Next, a window display control in the composite machine 1 is described. FIG. 4 is a flowchart showing a window display control in the composite machine 1. FIG. 5 is a diagram showing transitions of windows displayed on the display portion 410.

When an operative instruction reception window for receiving an instruction regarding any one of functions such as a copying function, a facsimile function, a printer function and a scanner function, for example, when an operative instruction reception window of a copying function shown in FIG. 5 is displayed on the display portion 410 (S1), if the help key 431 is pressed by an operator so that an operative instruction of displaying an operation guide window on the display portion is received at the help key 431 (YES in S2), the display controller 522 determines an operation guide window associated with an operative instruction reception window displayed on the display portion 410 at the time when the instruction is received (S3). The display controller 522 reads the image data of the determined operation guide window from the display image data storing portion 53 and controls the display portion 410 to display the image (S4).

For example, as a guide window with respect to an operator who looks at an operative instruction reception window of a copying function shown in FIG. 5, a list display window (first help window) shown in FIG. 5 is associated, and the image data of the list display window is stored in the display image data storing portion 53. When an instruction to display the operation guide window is received from an operator at the time when the operative instruction reception window of the copying function is displayed, the display control portion 522 reads the list display window data from the display image data storing portion 53 and controls the display portion 410 to display the list display window. Further, a document size selection guide window (second help window) shown in FIG. 5 is associated with a document size input window (next window from the operative instruction reception window of the copying function) and the image data of the document size selection guide window is stored in the display image data storing portion 53. When an instruction to display the operation guide window is received from an operator at the time when the document size input window is displayed, the display controller 522 reads out the document size selection guide window data from the display image data storing portion 53, plays the data and controls the display portion 410 to display the same.

As described above, an operation guide window displayed when a display instruction is received from an operator is differentiated in accordance with a kind of an operative instruction reception window being displayed on the display portion 410. Accordingly, an operation guide corresponding to a status of an operation and contents displayed on the display portion 410 can be provided to an operator sufficiently.

Further, an operative instruction reception window and an operation guide window may be associated such that display layer provided respectively to the operative instruction reception window and the operation guide window becomes the same. For example, respective windows constituting operative instruction reception windows are constructed such that the operative instruction reception window shown in FIG. 5 is in a first layer which is firstly displayed, and the document size input window is in a second layer which is secondly displayed. Further, respective windows constituting operation guide windows are constructed such that the list display window is in a first layer which is firstly displayed, and the document size selection guide window is in the second layer which is secondly displayed. The correspondence relationship is stored in the display image data storing portion 53, and correspondences between the operative instruction reception windows and the operation guide windows are set such that the images in the same layer are associated with each other. With the aforementioned arrangement, an operation guide which further accurately corresponds to a display status of the display portion 410 and a status of an operation by an operator can be provided to an operator.

When the display controller 522 controls the display portion 410 to display a list display window or a document size selection guide window as an operation guide window, the display controller 522 controls the display portion 410 to display the item key 411 and the termination key 413 in a case of displaying the list display window. In a case of displaying the operation guide window, the controller 522 controls the display portion 410 to display the shift key 412 and the termination key 413. When an instruction of terminating an operation guide window is received from an operator to the termination key 413 at the time when the display controller 522 displays on the display portion 410 the operation guide window (YES in S5), the display controller 522 controls the display portion 410 to display an original operative instruction reception window displayed before the operation guide window displayed in S4. (S6) Thereafter, the routine goes back to S2. In this case, the termination key 413 functions as a display termination key.

For example, when an instruction to terminate the list display window is received from an operator at the time when the display controller 522 controls the display portion 410 to switch from the operative instruction reception window of a copying function shown in FIG. 5 and display the list display window, the display controller 522 controls the display portion 410 to switch the display to an original operative instruction reception window of a copying function. When an instruction to terminate the document size selection guide window is received from an operator at the time when the display controller 522 controls the display portion 410 to switch from the document size input window shown in FIG. 5 and display the document size selection guide window, the display controller 522 controls the display portion 410 to switch the display to the original document size input window.

Further, when an instruction to switch a display to other operation guide image is received from an operator to the item key 411 or the shift key 412 (NO in S5, YES in S7) at the time when the display controller 522 controls the display portion 410 to display the operation guide window in S4, the display controller 522 determines another operation guide window associated with an operation guide window being displayed (S8), reads the determined operation guide window from the display images data storing portion 53 and controls the display portion 410 to display the determined window (S9). In this case, the item key 411 and the shift key 412 function as a layer switching reception key.

For example, when an operator presses the item key 411 of "SELECT DOCUMENT SIZE" so that an instruction to switch a display to another operation guide window is received at the time when the display controller 522 controls the display portion 410 to display a list display window shown in FIG. 5 in S4, the display controller 522 controls the display portion 410 to display a document size selection guide window associated in advance with the list display window as a window to be shown at the time when the list display window is displayed and the item key 411 of "SELECT DOCMENT SIZE" is pressed. In other words, the display controller 522 controls the display portion 410 to display an operation guide window (document size selection guide window) which is associated with the list display window and prepared in an immediate lower layer.

Further, when an operator presses the shift key 412 so that an instruction to switch a display to another operation guide window is received at the time when the display controller 522 controls the display portion 410 to display the document size selection guide window shown in FIG. 5 in S4, the display controller 522 controls the display portion 410 to display a list display window associated in advance with the document size selection guide window as a window to be displayed at the time when the document size selection window is displayed and the shift key 412 is pressed. In other words, the display controller 522 controls the display portion 410 to display an operation guide window (list display window) which is associated with the document size selection guide window and prepared in an immediate upper layer.

In S9, if an instruction to terminate the operation guide window is received from an operator to the termination key 413 (YES in S10), the display controller controls the display portion 410 to display the original operation guide image which was displayed before the operation guide window displayed in S9. Thereafter, the routine goes back to S5.

For example, when an instruction to terminate displaying the operation guide window is received from an operator to the termination key 413 at the time when the display controller 522 controls the display portion 410 to switch the list display window shown in FIG. 5 and display the document size selection window, the display controller 522 controls the display portion 410 to display the original list display window.

Further, when an instruction to switch a display to another operation guide window is received from an operator to the item key 411 or the shift key 412 (NO in S10, YES in S12), the display controller 522 shifts to a processing of displaying the next window (S3). In the processing of displaying the next window, the display controller 522 controls an image display corresponding to the pressing of the item key 411, the shift key 412 or the termination key 413, like the way described above.

The present invention is not limited to the configuration of the above-described embodiment but can be modified in various ways. For example, the association of an operative instruction reception window and an operation guide window is described with reference to FIG. 5. However, the invention is not limited to the example shown in FIG. 5. Further, the number of operative instruction reception window and the number of operation guide windows are not limited to the example shown in FIG. 5.

Further, in the above-described embodiment, a configuration and processing of the composite machine 1 are shown in FIGS. 1 to 5. However, these are mere examples. A configuration and processing of the composite machine 1 according to the invention are not limited to these.

Furthermore, in the above-described embodiment, an image forming apparatus according to the invention is described as the composite machine. However, the image forming apparatus according to the invention is not limited to a composite machine.

In summary, an image forming apparatus according to the invention comprises: a display portion for displaying an image; a storing portion for storing a plurality of operative instruction reception images, and operation guide images associated with the respective operative instruction reception images; a display controller for controlling the display portion to display an operative instruction reception image or an operation guide image stored in the storing portion; and an instruction receiving portion for receiving from an operator a display instruction to display an operation guide image. When the instruction receiving portion receives a display instruction, the display controller controls the display portion to display an operation guide image associated with an operative instruction reception image displayed on the display portion at the time when the instruction receiving portion receives a display instruction.

According to the aforementioned arrangement, when the instruction receiving portion receives a display instruction, the display controller controls the display portion to display an operation guide image associated with an operative instruction reception image displayed on the display portion at the time when the instruction receiving portion receives a display instruction. Accordingly, operation guide images corresponding to the operative instruction reception image being displayed are selectively displayed on the display portion. Thus, according to the invention, an appropriate operation guide is provided to an operator in accordance with contents displayed on the display portion which are timely changed in response to a status of operation. Accordingly, it becomes easy for an operator to effectively use various functions of an image forming apparatus.

Further, according to the invention, the display portion has a touch-panel function for receiving an instruction from an operator. When the instruction receiving portion receives the display instruction, the display controller controls the display portion to display an operation guide image associated with an operative instruction reception image being displayed and a switching reception key for receiving a display window switching instruction from an operator with the touch-panel function. When the switching reception key receives the switching instruction, the display controller reads out from the storing portion another operation guide image associated with an operation guide image being displayed at the time when the switching key receives the switching instruction, and controls the display portion to display the operation guide image.

According to the aforementioned arrangement, when the instruction receiving portion receives from an operator an instruction to switch a display window via the switching reception key at the time when it controls the display portion to display an operation guide image associated with an operative instruction reception image, the display controller controls the display controller to display another operation guide image associated with an operation guide image being displayed. Accordingly, an operator can further obtain an operation guide through display of another operation guide image. Thus, operability for an operator improves.

Further, according to the invention, the storing portion stores a plurality of layers of operative instruction reception images and a plurality of layers of operation guide images. A respective operative instruction reception images and a respective operation guide images in the same layer are associated with each other. When the operation receiving portion receives the display instruction, the display controller reads out from the storing portion an operation guide image associated with an operative instruction reception image in the same layer being displayed on the display portion at the time when the operation receiving portion receives the display instruction.

Further, according to the invention, the instruction receiving portion is constructed by a mechanical key provided on a front side surface of a main body of the image forming apparatus.

According to the aforementioned arrangement, when the instruction reception portion receives the display instruction, and the display controller controls the display portion to display an operation guide image associated with an operative instruction reception image being displayed, the display controller controls the display portion to display an operation guide image which is in the same layer with an operative instruction reception image being displayed. Accordingly, an operation guide can be provided which is appropriately accommodated to an operative step.

Further, according to the invention, the display portion has a touch-panel function for receiving an instruction from an operator. When the instruction reception portion receives the display instruction, the display controller controls the display portion to display an operation guide image associated with an operative instruction reception image being displayed and a layer switching key for receiving a layer switching instruction from an operator through the touch-panel function. When the layer switching key receives the layer switching instruction, the display controller reads out, at the time when the layer switching key receives the layer switching instruction, from the storing portion an operation guide image located in another layer and associated with an operation guide image being displayed, and controls the display portion to display the operation guide image.

According to the aforementioned arrangement, when the layer switching key receives the layer switching instruction, the display controller controls the display portion to display an operation guide image in a different layer associated with an operation guide image being displayed at the time when the layer switching instruction is received. Accordingly, an operation guide image in a different layer can be displayed on the display portion with an easy operation by an operator. For example, without operations for displaying an operative instruction reception image placed in the same layer as of a layer desired to be displayed and bringing up an operation guide image in the same layer associated with the operative instruction reception window, an operator can make the display portion directly display an operation guide image placed in a different layer from a state where an operation guide image is displayed on the display portion.

Further, according to the invention, when the operation guide image is displayed, the display controller controls the display portion to display a display termination key for receiving through the touch-panel function an instruction to terminate display of the operation guide image. When the display termination key receives the display termination instruction, the display controller reads out from the storing portion an operation guide image or an operative instruction reception image displayed immediately before the operation guide image displayed at the time when the display termination instruction is received and controls the display portion to display the operation guide image or the operative instruction reception image.

According to the aforementioned arrangement, when the display termination key receives the display termination instruction, the display controller controls the display portion to display an operation guide image or an operative instruction reception image displayed immediately before the operation guide image displayed at the time when the display termination instruction is received. Accordingly, an operator can make the display portion display an image at the last time with easy operation.

Further, the invention includes a display control program product for controlling a display portion of a computer to display an operation guide in accordance with an instruction received from an operator to an instruction receiving portion of the computer. The display control program product comprises: a storing portion for storing a plurality of operative instruction reception images, and operation guide images associated with the respective operative instruction reception images; and a display controller for controlling the display portion to display an operative instruction reception image or an operation guide image stored in the storing portion. The display control program product controls a computer to function such that when the instruction receiving portion receives a display instruction, the display controller controls the display portion to display an operation guide image associated with an operative instruction reception image displayed on the display portion at the time when the instruction receiving portion receives a display instruction.

Further, the invention includes the display control program product for controlling the display portion having a touch-panel function to display an operation guide. When the instruction receiving portion receives the display instruction, the display controller controls the display portion to display an operation guide image associated with an operative instruction reception image being displayed and a switching reception key for receiving a display window switching instruction from an operator with the touch-panel function. When the switching reception key receives the switching instruction, the display controller reads out from the storing portion another operation guide image associated with an operation guide image being displayed at the time when the switching key receives the switching instruction, and controls the display portion to display the operation guide image.

Further, the invention includes the display control program product for controlling the display portion having a touch-panel function to display an operation guide, wherein the storing portion stores a plurality of layers of operative instruction reception images and a plurality of layers of operation guide images, a respective operative instruction reception image and a respective operation guide images in the same layer are associated with each other. When the operation receiving portion receives the display instruction, the display controller reads out from the storing portion an operation guide image associated with an operative instruction reception image in the same layer being displayed on the display portion at the time when the operation receiving portion receives the display instruction.

Further, the invention includes the display control program product, wherein when the operation guide image is displayed, the display controller controls the display portion to display a display termination key for receiving through the touch-panel function an instruction to terminate display of the operation guide image. When the display termination key receives the display termination instruction, the display controller reads out from the storing portion an operation guide image or an operative instruction reception image displayed immediately before the operation guide image displayed at the time when the display termination instruction is received, and makes the display portion display the operation guide image or the operative instruction reception image.

Further, the invention includes the display control program product, wherein the storing portion stores a plurality of layers of operative instruction reception images and a plurality of layers of operation guide images, a respective operative instruction reception image and a respective operation guide images in the same layer are associated with each other. When the operation receiving portion receives the display instruction, the display controller reads out from the storing portion an operation guide image associated with an operative instruction reception image in the same layer being displayed on the display portion at the time when the operation receiving portion receives the display instruction.

This application is based on Japanese Patent application serial no. 2006-049317 filed in Japan Patent Office on Feb. 24, 2006, the contents of which are hereby incorporated by reference. Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus comprising:
a display portion for displaying an image, the display portion having a touch-panel function for receiving an instruction from an operator;
a storing portion for storing a plurality of operative instruction reception images and operation guide images associated with the respective operative instruction reception images;
a display controller for controlling the display portion to display an operative instruction reception image or an operation guide image stored in the storing portion; and
an instruction receiving portion for receiving from an operator a display instruction to display an operation guide image,
wherein when the instruction receiving portion receives the display instruction, the display controller reads from the storing portion the operation guide image associated with the operative instruction reception image displayed on the display portion at the time when the instruction receiving portion receives the display instruction, and controls the display portion to display the operation guide image, and
the storing portion stores a plurality of layers of operative instruction reception images and a plurality of layers of operation guide images, a respective operative instruction reception image and a respective operation guide images in the same layer are associated with each other; and
when the instruction receiving portion receives the display instruction, the display controller controls the display portion to display the operation guide image associated with the operative instruction reception image in the same layer being displayed on the display portion in accordance with said association, and controls the display portion to display a layer switching key for receiving a layer switching instruction from an operator through the touch-panel function, and when the layer switching key receives the layer switching instruction, the display controller reads out from the storing portion an operation guide image located in another layer and associated with an operation guide image being displayed, and controls the display portion to display the operation guide image, and when the operation guide image is displayed, the display controller controls the display portion to display a display termination key for receiving through the touch-panel function an instruction to terminate display of the operation guide image, and when the display termination key receives the display termination instruction, the display controller determines if the operation guide image displayed at the time when the display termination instruction is received is an image which is shifted from the operation guide image or the operative instruction reception image in the same layer in accordance with the reception of the display instruction at the instruction receiving portion, or an image which is shifted from the operation guide image in another layer in accordance with reception of the layer switching instruction at the layer switching reception key, and when the display controller determines that the operation guide image displayed at the time when the display termination instruction is received is the image which is shifted from the operation guide image or the operation instruction reception image in the same layer in accordance with the reception of the display instruction at the instruction receiving portion, the display controller controls the display portion to display the operation guide image or the operation instruction reception image located in the same layer and displayed before the operation guide image being displayed, and when the display controller determines that the operation guide image displayed at the time when the display termination instruction is received is the image which is shifted from the operation guide image in another layer in accordance with reception of the layer switching instructions at the layer switching reception key, the display controller controls the display portion to display the operation guide image located in another layer and displayed before the currently displayed operation guide image.

2. The image forming apparatus according to claim 1, wherein the instruction receiving portion is constructed by a mechanical key provided on a front side surface of a main body of the image forming apparatus.

3. A computer-readable recording medium storing a display control program for controlling a display portion of a computer to display an operation guide in accordance with an instruction received from an operator to an instruction receiving portion of the computer, the display control program comprising:
a storing portion for storing a plurality of operative instruction reception images and operation guide images associated with the respective operative instruction reception images; and
a display controller for controlling the display portion to display an operative instruction reception image or an operation guide image stored in the storing portion;
wherein the display control program controls a computer to function such that when the instruction receiving portion receives the display instruction, the display controller reads from the storing portion the operation guide image associated with the operative instruction reception image displayed on the display portion at the time when the instruction receiving portion receives the display instruction and controls the display portion to display the operation guide image, and the storing portion stores a plurality of layers of operative instruction reception images and a plurality of layers of operation guide images, a respective operative instruction reception image and a respective operation guide images in the same layer are associated with each other; and when the instruction receiving portion receives the display instruction, the display controller reads out from the storing portion the operation guide image associated with the operative instruction reception image in the same layer being displayed on the display portion at the time when the instructing receiving portion receives the display instruction, in accordance with said association, and controls the display portion to display the read images, and when the instruction receiving portion receives the display instruction, the display controller controls the display portion to display the operation guide image located in the same layer as the operative instruction reception image being displayed on the display portion in accordance with said association, and controls the display portion to display a layer switching key for receiving a layer switching instruction from an operator through the touch-panel function, and when the layer switching key receives the layer switching instruction, the display controller reads out from the storing portion an operation guide image located in another layer and associated with an operation guide image being displayed, and controls the display portion to display the operation guide image, and when the operation guide image is displayed, the display controller controls the display portion to display a display termination key for receiving through the touch-panel function an instruction to terminate display of the operation guide image, and when the display termination key receives the display termination instruction, the display controller determines if the operation guide image displayed at the time when the display termination instruction is received is an image which is shifted from the operation guide image or the operative instruction reception image in the same layer in accordance with the reception of the display instruction at the instruction receiving portion, or an image which is shifted from the operation guide image in another layer in accordance with reception of the layer switching instruction at the layer switching reception key, and when the display controller determines that the operation guide image displayed at the time when the display termination instruction is received is the image which is shifted from the operation guide image or the operation instruction reception image in the same layer in accordance with the reception of the display instruction at the instruction receiving portion, the display controller controls the display portion to display the operation guide image or the operation instruction reception image located in the same layer and displayed before the operation guide image being displayed, and when the display controller determines that the operation guide image displayed at the time when the display termination instruction is received is the image which is shifted from the operation guide image in another layer in accordance with reception of the layer switching instructions at the layer switching reception key, the display controller controls the display portion to display the operation guide image located in another layer and displayed before the currently displayed operation guide image.

4. An image forming apparatus comprising:

a display portion for displaying an image;

a storing portion for storing a plurality of operative instruction reception images and operation guide images associated with the respective operative instruction reception images, each operative instruction reception image being configured for prompting a user to request instruction regarding a function of the apparatus and each operation guide image being configured for displaying respective operation methods relating to the functions of the apparatus;

a display controller for controlling the display portion to display in a window an operative instruction reception image or an operation guide image stored in the storing portion; and an instruction receiving portion for receiving from an operator a display instruction to display an operation guide image, wherein when the instruction receiving portion receives the display instruction, the display controller reads from the storing portion the operation guide image associated with the operative instruction reception image displayed in a window of on the display portion at the time when the instruction receiving portion receives the display instruction, and controls the display portion to display the operation guide image, and the storing portion stores a plurality of layers of operative instruction reception images and a plurality of layers of operation guide images, a respective operative instruction reception image and a respective operation guide images in the same layer are associated with each other; and when the instruction receiving portion receives the display instruction, the display controller controls the display portion to display the operation guide image associated with the operative instruction reception image in the same layer being displayed in a window on the display portion in accordance with said association, and controls the display portion to display a layer switching key for receiving a layer switching instruction from an operator through the touch-panel function, and when the layer switching key receives the layer switching instruction, the display controller reads out from the storing portion an operation guide image located in another layer and associated with an operation guide image being displayed, and controls the display portion to display the operation guide image, and when the operation guide image is displayed, the display controller controls the display portion to display a display termination key for receiving through the touch-panel function an instruction to terminate display of the operation guide image, and when the display termination key receives the display termination instruction, the display controller determines if the operation guide image displayed at the time when the display termination instruction is received is an image which is shifted from the operation guide image or the operation instruction reception image in the same layer in accordance with the reception of the display instruction at the instruction receiving portion, or an image which is shifted from the operation guide image in another layer in accordance with reception of the layer switching instruction at the layer switching reception key, and when the display controller determines that the operation guide image displayed at the time when the display termination instruction is received is the image which is shifted from the operation guide image or the operation instruction reception image in the same layer in accordance with the reception of the display instruction at the instruction receiving portion, the display controller controls the display portion to display the operation guide image or the operation instruction reception image located in the same layer and displayed before the operation guide image being displayed, and when the display controller determines that the operation guide image displayed at the time when the display termination instruction is received is the image which is shifted from the operation guide image in another layer in accordance with reception of the layer switching instruction at the layer switching reception key, the display controller controls the display portion to display the operation guide image located in another layer and displayed before the currently displayed operation guide image.

* * * * *